(No Model.)

L. GAILLARD.
MEANS FOR UTILIZING THE POWER OF RUNNING WATER FOR PROPELLING VESSELS.

No. 320,125. Patented June 16, 1885.

Witnesses:-
W. E. Poulter
P. M. Knobloch

Inventor:-
Leopold Gaillard,
per Henry Orth
his atty

UNITED STATES PATENT OFFICE.

LÉOPOLD GAILLARD, OF LIVRON, FRANCE.

MEANS FOR UTILIZING THE POWER OF RUNNING WATER FOR PROPELLING VESSELS.

SPECIFICATION forming part of Letters Patent No. 320,125, dated June 16, 1885.

Application filed February 13, 1885. (No model.) Patented in France July 25, 1884, No. 163,519.

*To all whom it may concern:*

Be it known that I, LÉOPOLD GAILLARD, a citizen of the Republic of France, residing at Livron, in France, have invented new and useful Improvements in Means for Utilizing the Power of Running Water for Propelling a Vessel Floating Therein, of which the following is a specification.

This invention relates to a vessel or tug in which a water-wheel operated by a water-course replaces the engine, a pitch-chain provided in the river or water-course gearing with a chain-pulley on the vessel for this purpose, the latter being actuated by a float-wheel.

Figure 1:
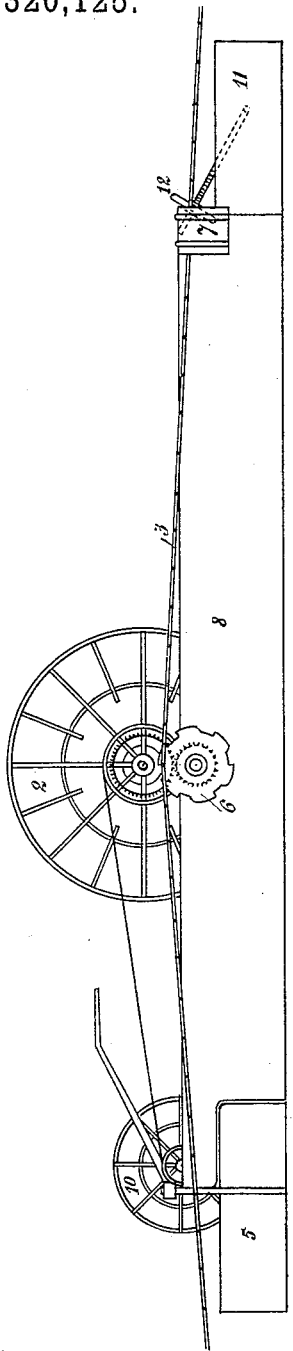
Figure 2:
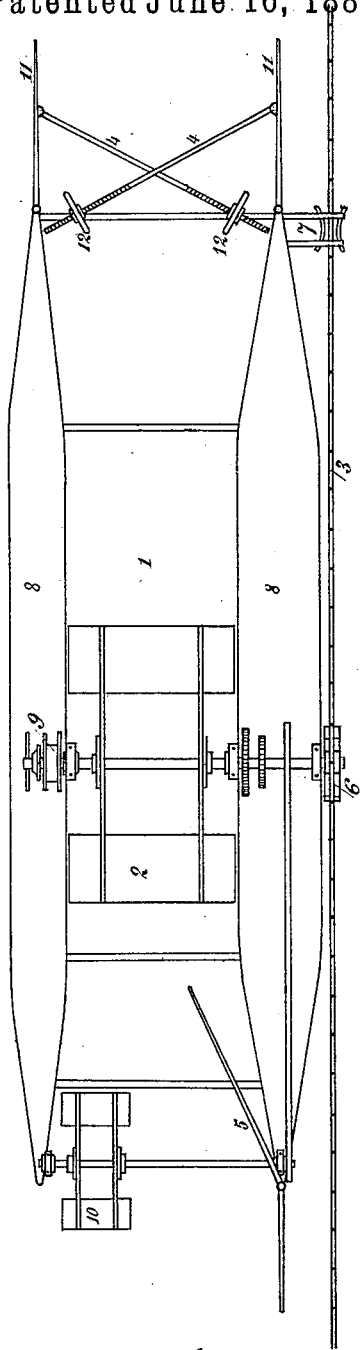

In the accompanying drawings, Figure 1 shows this vessel in elevation. Fig. 2 shows the same in plan view.

The vessel is composed of two hulls, so connected by stays that a water-way, 1, is formed between them. Upon the two coupled hulls is transversely supported a shaft mounted in suitable bearings, and upon it the paddle-wheel or float-wheel 2 is keyed. This shaft, by a pair of toothed wheels, actuates a second shaft, placed directly beneath it, which carries the chain-pulley 6. The chain 3, suitably provided in the river or water-course, gears with the said chain-pulley 6. The shaft upon which the pulley 6 is fixed may be fitted with gear-wheels of different sizes, so as to allow the speed to be varied.

11 11 are gates placed at the forward end of the hulls, and serve to admit the current into the water-way between the hulls or to exclude it therefrom, whereby the vessel may be caused to travel or to stop. These doors are operated by the rods 4, which are screw-threaded at one end and adjusted by hand-wheels upon nuts 12 12, held upon the braces or stays between the two hulls.

Upon the shaft of the wheel 2 a drum, 9, is fixed, and serves to wind a cable or rope when the vessel is not to be actuated by the chain. This drum also allows the vessel to be displaced toward the right or the left by winding a traversing cable. The drum may, moreover, be used in loading and unloading by providing the vessel with a suitable hoist, having a corresponding pulley upon which to run the rope.

A small paddle-wheel, 10, which is at the rear of the vessel, is operated off the wheel 2 by means of a belt. When the vessel goes up stream, the little wheel relieves the chain and keeps the vessel straight, as the latter, being moved from one side only, by the chain, would tend to assume an oblique position, while said wheel, which can be immersed more or less, so as to exert more or less power, serves to keep the vessel straight or to allow her to assume the oblique position, as may be desired. This wheel 10 gives an impulse in going down stream, as the boat, not being then driven by the chain-gear, goes faster than the stream, as every vessel, more particularly if loaded, travels about a third faster than the water. It follows that a current is thus produced which turns the wheel 2 and imparts a certain amount of power to the wheel 10, and by immersing the latter wholly or partly all this power, or part of it, is used.

A rudder, 5, serves to direct the vessel in the usual way. The pitch-chain 3 is placed in the strongest current of the river-bed and passes over the wheel 6, having teeth or studs, as usual, the chain being, moreover, led over a guide, 7, placed in the forward portion of the boat.

The vessel is operated in the following manner: When going up stream the doors 11 are open and a swifter current is produced in the water-way 1, by reason of being narrowed down, than that of the river-bed or water-course. This current actuates the wheel 2, thereby causing the chain pulley or wheel 6 to rotate and the vessel to be driven forward. In descending the river or water-course, the vessel being faster than the current, as above mentioned, and consequently proceeding faster than the water in the water-way 1 between the hulls, causes the rotation of the wheel.

I claim—

1. The combination, with a twin boat, a rudder connected with one of the boats, and a revolving steering-wheel, 10, for steering the other boat, mounted on a cross-shaft carrying a belt-pulley, of the propeller-wheel 2, located in the channel between the two boats, the shaft of which carries a belt-pulley belted to the pulley on shaft of wheel 10, as described.

2. The combination, with a twin boat, of a propeller, 2, located in the channel or space between the two boats, an auxiliary steering and propelling wheel, 10, driven from the propeller 2, and a guide chain and gearing driven from wheel 2 for guiding or propelling the boat along said chain, as described.

3. The combination, with a twin boat, a propelling-wheel, 2, located in the channel between the two boats, and an auxiliary propelling-wheel, 10, at the stern of the boat, driven from wheel 2, of the gates 11, screw-rods 4, and hand-wheels 12, for adjusting the gates or closing the same, as described.

4. The combination, with a twin boat, a rudder, 5, applied to one of the boats, a propelling and steering wheel, 10, applied in proximity to the other boat, a propeller, 2, located in the channel or space formed between the boats and the gates 11, of the chain 3, and gearing to propel the boat and wheel 10 from wheel 2, as described.

In testimony whereof I have hereunto set my hand in the presence of two subscribing witnesses.

LÉOPOLD GAILLARD.

Witnesses:
ROBT. M. HOOPER,
BONNE.